UNITED STATES PATENT OFFICE.

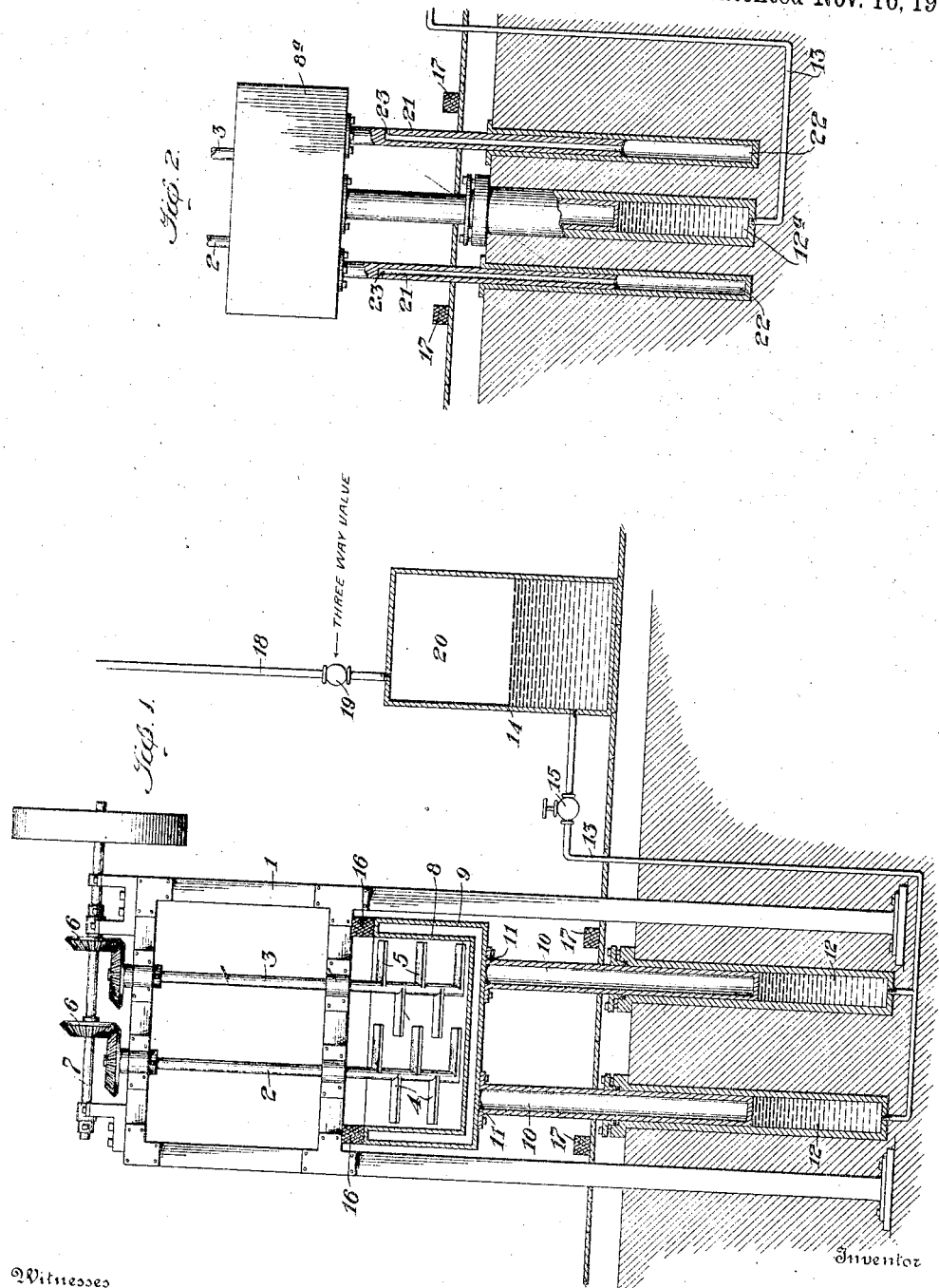

HERBERT TALLEY, OF JOPLIN, MISSOURI.

MIXING-MACHINE FOR EXPLOSIVES.

940,216.

Specification of Letters Patent.   Patented Nov. 16, 1909.

Application filed June 7, 1909.   Serial No. 500,483.

*To all whom it may concern:*

Be it known that I, HERBERT TALLEY, a citizen of the United States, residing at Joplin, county of Jasper, and State of Missouri, have invented certain new and useful Improvements in Mixing-Machines for Explosives, of which the following is a specification.

This invention relates to mixing machines for explosives.

The present invention has for its object the provision of a mixing machine for the treatment of plastic substances, particularly explosive gelatin and dynamites, which will possess novel features of construction whereby the bowl or receptacle in which the mixing operation is conducted by stirrers or mixers, will be adapted to be raised or lowered by hydraulic pressure and will be rendered self-sustaining without requiring the employment of supplemental sustaining devices.

In mixing machines, particularly those for the mixing of explosives, it has been heretofore proposed to raise and lower the mixing devices or stirrers in one type of machine and in another type to raise and lower the mixing bowl or receptacle to position the mixers inside or outside of said mixing bowl, the separation of the bowl and the mixing means being required at different times, as when filling the bowl or removing its contents, cleaning the bowl and mixers, etc.

There is an advantage in having the bowl raised and lowered instead of the mixing devices; for the bowl is thus positioned at a height which is more convenient to the operator of the machine and by having the mixing devices incapable of vertical movement, the employment of special constructions involving additional expense is avoided.

In raising and lowering the mixing bowl by hydraulic action, the bowl is rendered self-sustaining and thus the expense of additional devices to sustain the bowl against falling is obviated, as such devices become unnecessary.

In carrying out the invention there are provided relatively stationary rotary mixers or stirrers, in connection with a hydraulically raised mixing bowl or receptacle, the hydraulic pressure sustaining the mixing bowl in whatever position it may assume.

The invention may be carried out in different ways, certain of which are shown in the accompanying drawings and set forth in the following specification.

In the accompanying drawings:—Figure 1 is a vertical elevation, partly in section, showing the mixing bowl in its raised position; and Fig. 2, a similar view of a modification.

In the machine frame 1 there are journaled the vertically disposed stirrer or mixer shafts 2 and 3 which carry the interacting stirrers or mixers 4 and 5 and are operated by suitable gears 6 from a shaft 7.

The mixing bowl or receptacle 8, which is provided with a jacket 9 having suitable connections, is supported by pistons 10 secured to the bottom thereof at 11 and working in hydraulic cylinders 12 which are supplied with the water or other heavy fluid by a pipe 13 leading to an accumulator 14 which contains the motive-fluid. A valve 15 is utilizable to prevent back flow of the fluid from the cylinders after the mixing bowl has been raised and thus accidental dropping of the bowl is rendered impossible because water or other similar heavy liquid is practically incompressible. By virtue of the hydraulic lift, the employment of any supplemental locking or supporting means is rendered unnecessary and the mixing bowl can be safely positioned up or down with rapidity. Buffers 16 and 17 limit the play of the bowl and prevent any sudden jars. The accumulator 14 has a pipe 18 controlled by a suitable three-way valve 19 for the admission or exhaust to the atmosphere of compressed air which occupies the upper part of the accumulator as shown at 20. The admission or exhaust of the air pressure by operating the valve 19 enables the mixing bowl to be raised or lowered at will.

In the modification shown in Fig. 2, but one hydraulic cylinder 12ª is employed, the mixing bowl 8ª having depending guides 21 which snugly yet easily fit cylinders 22. Grooves 23 may be provided for the escape of the air from the cylinders 22 when the bowl descends.

Having thus described my invention, what I claim as new and desire to secure by Letters Patent, is:—

1. In a mixing machine, the combination with mixing means, of a movable bowl or receptacle in which the mixing means is adapted to operate, and hydraulic means for raising, lowering, and supporting the mixing bowl wherever positioned.

2. In a mixing machine, the combination with mixing means, of a movable bowl or receptacle in which the mixing means is adapted to operate, hydraulic means for raising and lowering the mixing bowl, and a valve for shutting off back flow of the hydraulic pressure, whereby the mixing bowl is supported where positioned.

3. In a mixing machine, the combination with mixing means, of a movable bowl or receptacle in which the mixing means is adapted to operate, hydraulic means for raising and lowering the mixing bowl whereby the mixing bowl is supported where positioned, and an accumulator for said hydraulic means which has controllable means for the admission and exhaust of compressed air to control the raising and lowering of the mixing bowl.

4. In a mixing machine, the combination with mixing means, of a movable bowl or receptacle in which the mixing means is adapted to operate, a hydraulically operated piston on which the bowl is supported and by which said bowl is raised and lowered, and means for hydraulically operating said piston and sustaining the pressure thereon.

In testimony whereof, I hereunto affix my signature in presence of two witnesses.

HERBERT TALLEY.

Witnesses:
   LOUIS DU HADWAY,
   P. C. TALLEY.